Nov. 8, 1927.
M. A. ENDICOTT
COOKING UTENSIL
Filed May 23, 1925
1,648,725
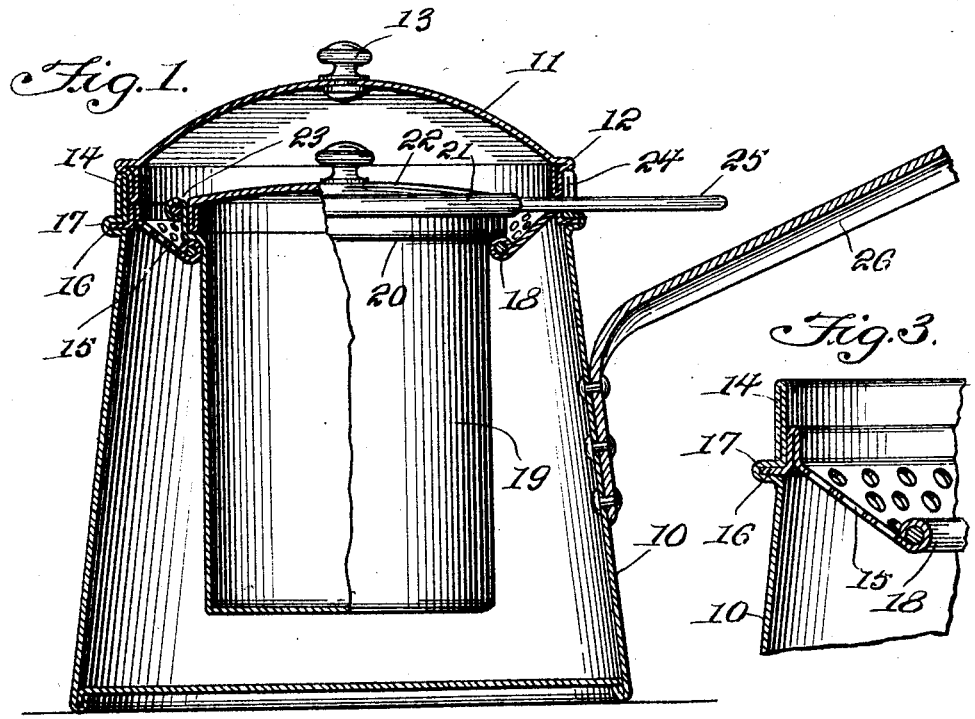
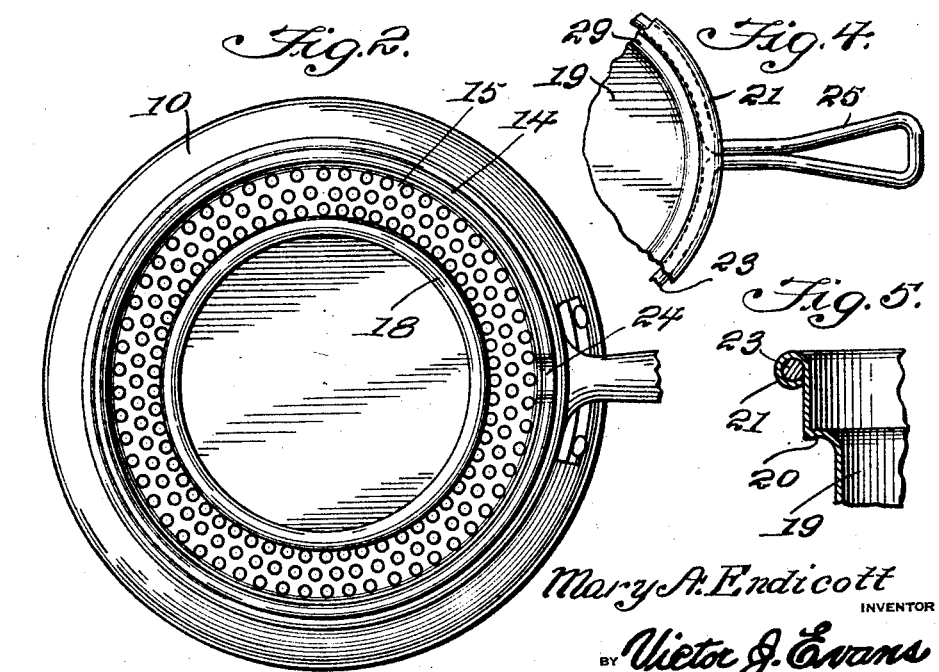

Patented Nov. 8, 1927.

1,648,725

UNITED STATES PATENT OFFICE.

MARY A. ENDICOTT, OF TERRE HAUTE, INDIANA.

COOKING UTENSIL.

Application filed May 23, 1925. Serial No. 32,425.

This invention relates to cooking utensils and has particular relation to double boilers or double cookers, an object being to provide a utensil of this character which will hold a maximum amount of water and in which steam from the water may pass upward and be deflected upon the inner or food container so that the contents of the latter will be evenly heated and thoroughly cooked.

Another object of the invention is the provision of a utensil of this character in which the inner container or food vessel is supported in a novel manner and both the inner and outer containers closed in such manner as to prevent water from splashing outward.

With the above and other objects in view, the invention further includes the following novel features and details of construction, to be hereinafter more fully described, illustrated in the accompanying drawings and pointed out in the appended claim.

In the drawings:—

Figure 1 is a sectional view partly in elevation showing a cooking utensil constructed in accordance with the invention.

Figure 2 is a top plan view with the inner container and the cover of the outer container removed.

Figure 3 is an enlarged fragmentary sectional view illustrating the manner of securing the perforated annulus or supporting flange in place.

Figure 4 is a fragmentary view illustrating the manner of securing the handle to the inner container.

Figure 5 is an enlarged fragmentary sectional view taken through the upper part of the inner container.

Referring to the drawings in detail wherein like characters of reference denote corresponding parts, the reference character 10 indicates an outer container or vessel which is preferably flared at its bottom so as to provide a relatively large supporting surface and accommodate a relatively great amount of water. This outer container is provided with a dome-shaped removable cover 11, having a bead 12 which is adapted to rest upon the upper edge of the container and a handle or knob 13. The upper edge of the container 10 is preferably rolled or turned over as indicated at 14.

Extending around the inside of the container 10 adjacent the top thereof is a perforated annulus or flange 15. The outer edge 16 is of this annulus or flange is clamped between the walls of a bead 17 which extends outwardly around the container 10 and which in addition to reinforcing the container provides convenient means for securing the annulus or flange 15 in place. The annulus or flange 15 inclines downwardly and inwardly and its inner edge is rolled as indicated at 18.

Removably located within the outer container 10 is an inner container or food vessel 19, the latter having extending around its upper edge a shoulder 20 which is adapted to engage the bead 17 so that the container 19 is supported spaced from the outer container. The upper edge of the container 19 is preferably rolled as indicated at 21 and is provided with a removable cover 22.

The rolled edge of the container 19 encloses a wire 23 which is looped intermediate its ends and extends outwardly through an opening or notch 24 provided in the container 10, the loop portion being elongated in form so as to provide a handle 25. A handle 26 is secured to the container 10.

The invention is susceptible of various changes in its form, proportions and minor details of construction and the right is herein reserved to make such changes as properly fall within the scope of the appended claim.

Having described the invention what is claimed is:—

A cooking utensil comprising an outer container, a removable lid therefor, a perforated annulus extending around the inside of the container adjacent the top thereof, an outwardly disposed bead formed intermediate the length of the wall of and extending around the outer container and receiving the outer edge of the annulus to clamp and hold the latter in place, an inner container, an annular shoulder extending around the inner container adjacent the top thereof for engagement over the inner edge of the perforated annulus, whereby the inner container will be supported spaced from the outer container, a removable lid for the inner container, a handle for the outer container and a handle extending from the inner container through an opening provided in the outer container.

In testimony whereof I affix my signature.

MARY A. ENDICOTT.